W. BULLARD.
CLEANING ATTACHMENT FOR HAND RAKES.
APPLICATION FILED AUG. 10, 1909.
948,497.
Patented Feb. 8, 1910.
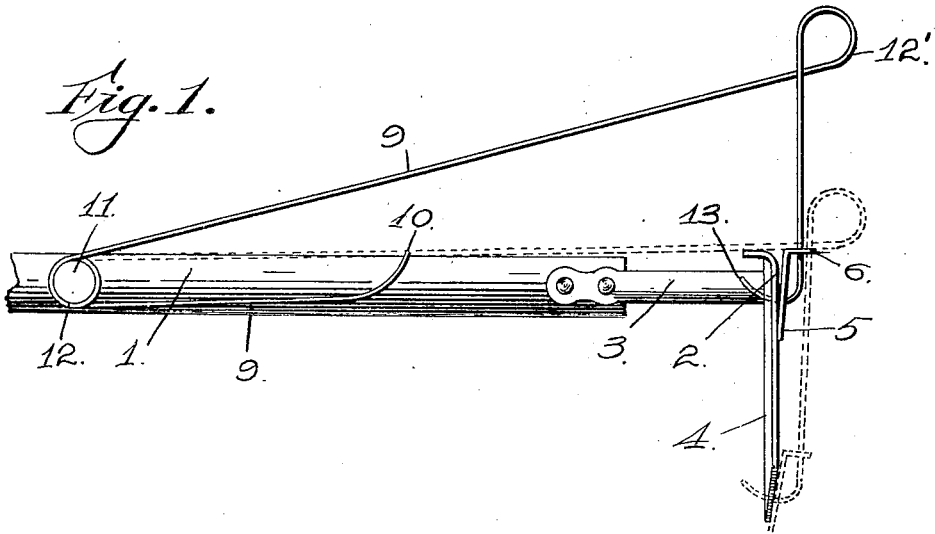
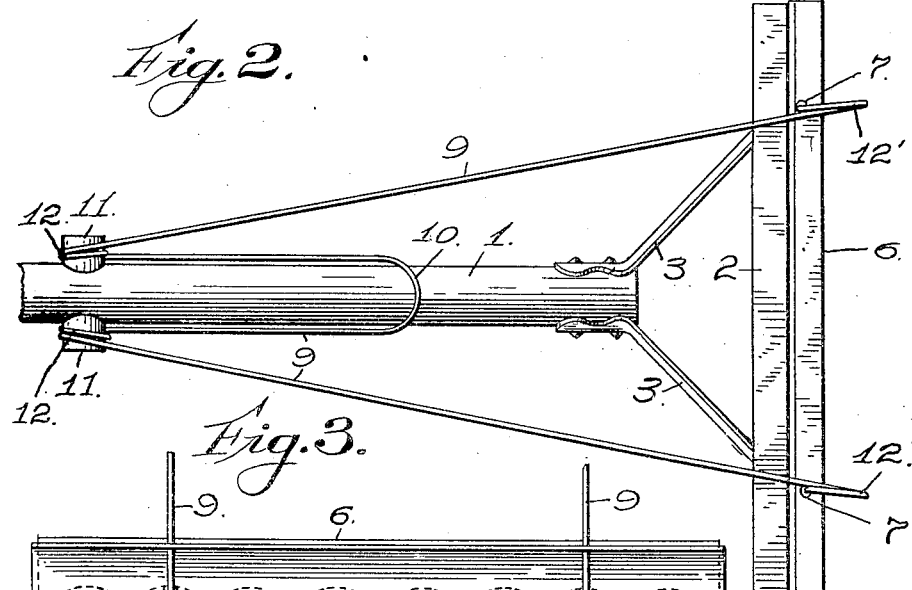
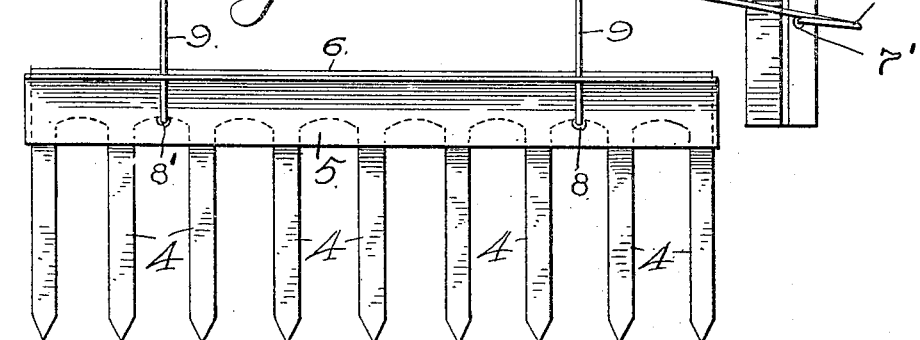

UNITED STATES PATENT OFFICE.

WALTER BULLARD, OF CHICO, CALIFORNIA.

CLEANING ATTACHMENT FOR HAND-RAKES.

948,497.　　　　　Specification of Letters Patent.　　Patented Feb. 8, 1910.

Application filed August 10, 1909.　Serial No. 512,111.

To all whom it may concern:

Be it known that I, WALTER BULLARD, a citizen of the United States, residing at Chico, in the county of Butte and State of California, have invented certain new and useful Improvements in Cleaning Attachments for Hand-Rakes, of which the following is a specification.

The hereinafter described invention is designed for use in connection with an ordinary garden rake, and the object thereof is to clean the rake teeth or free the same of accumulation of leaves, grass or similar material which may adhere thereto to such an extent as to clog the same and destroy the usefulness thereof until removed. Usually, attachments of this character work between the teeth of the rake, and have a limit of movement co-extensive with or approximately the length of the teeth, which result, when the cleaner is placed into action, in forcing the accumulated leaves, grass or debris generally toward the point of the teeth, but do not eject the same therefrom. As the debris to a great extent is left clinging to the point of the rake teeth, it is required that the operator thereof remove the same by hand.

The ejector, cleaner or scraper as hereinafter described is so arranged relative to the rake teeth as to bear thereagainst at all times and at a slight inclination to the vertical face of the rake teeth, so that when the scraper is forced downwardly the same wipes the rake teeth, so to speak free of all accumulated matter, and as the limit of the downward stroke permitted the scraper is slightly greater than the length of the teeth, the scraper when depressed not only wipes clean the rake teeth, but positively ejects therefrom all accumulated debris collected thereon during the use of the rake.

To comprehend the invention, reference should be had to the accompanying sheet of drawings, wherein—

Figure 1 is a side view of an ordinary garden rake with the improved ejector applied thereto, the position thereof relative to the rake teeth when forced downwardly being illustrated in dotted lines. Fig. 2 is a top plan view of the features disclosed by Fig. 1 of the drawings. Fig. 3 is a front view of the rake with the ejector positioned relative to the rake head, the spring for the ejector being broken away.

In the drawings, the numeral 1 is used to designate the rake handle, which is connected to the rake head 2 by the shank 3. From the rake head 2 depend the slightly curved rake teeth 4, and in advance of or against the outer face of said teeth is arranged or located the vertically movable scraper or ejector blade 5. This scraper or ejector blade may be constructed of any suitable material, although preference is given to sheet metal owing to the fact that the same may be stamped therefrom. In length the scraper or ejector blade is co-extensive with the rake head 2, and lies parallel therewith and at a slight inclination to the face thereof in order that its lower inner edge will stand against the outer face of the rake teeth 4 adjacent the head 2.

The scraper or ejector blade 5 is formed at its upper edge with an outwardly extended longitudinally disposed flange 6, which flange is provided with the apertures 7—7', situated in alinement with the apertures 8—8' formed in the scraper or ejector blade 5.

The scraper or ejector blade 5 is held in position relative to the rake head and its teeth by means of the spring 9, which is preferably composed of steel spring wire. The central portion of the securing and tension spring is formed into an arch 10, which bows over the handle 1 adjacent the shank 3, and from said arched section the wires extend inwardly from the rake head and are then turned about the knobs 11, projecting from opposite sides of the handle 1, to form coils 12, the free ends of the wires being then extended upwardly and outwardly at a divergent inclination to points slightly above the rake head where they are turned upon themselves to form coils 12', the ends then being carried downwardly at a slight inward inclination and passed through the apertures 7—7' of the flanged portion 6 and thence through the apertures 8—8' in the scraper or ejector blade 5. The ends extended through the apertures 8—8' are curved slightly upwardly and form heads 13, which, work between certain of the rake teeth 4, and when the scraper or ejector blade 5 moves upwardly the full limit of its stroke impinge against the under face of the rake head 2 and serve as stops for limiting the upward or return movement of the said scraper or ejector blade 5. The spring 9 thus serves as the means for restoring the scraper or ejector blade to its normal position, and to hold its lower edge against and at an inclination to the face of the rake teeth throughout its line of movement, while the curved heads 13, formed by the free ends thereof, answer as stops for limiting the upward movement or stroke thereof.

When the rake teeth 4 become clogged or fouled with accumulated matter, while used for the raking of a lawn, the operator simply turns the rake over and exerts a downward pressure thereon. The coils 12′ contacting with the ground, act as a leverage, by reason of the pressure brought to bear onto the rake, causing the rake head to move inwardly until its movement is arrested by engagement with the spring 9, during which movement of the rake head, the edge of the scraper or ejector blade bears against the face of the rake teeth and wipes the same clear of all accumulated matter, and, as the said blade moves beyond the point of the said teeth when depressed its full stroke, the accumulated matter is positively ejected from the teeth of the rake. When the rake is turned into working position, the tension of the spring 9 restores the scraper or ejector blade to normal position.

Having thus described the invention what is claimed as new and desired to be protected by Letters Patent is:—

1. In a garden rake, the combination with the head thereof, of a cleaning blade arranged in advance of the rake head and at an inclination to the face thereof and the teeth projecting therefrom, a spring extended through a flange extended from the cleaning blade and through apertures in the body of said blade and having the projecting ends thereof curved to form stops for limiting the upward movement of the blade, the central portion of said spring being arched to overlie the handle of the rake and united thereto by being coiled onto knobs projecting laterally from the rake handle, the spring intermediate the coiled portions and the cleaning blade being upwardly inclined to a point above the rake head sufficient to permit of the said blade clearing the points of the rake teeth on the same being forced downwardly its full distance.

2. In a garden rake, the combination with the head thereof, of a cleaning blade arranged parallel with the rake head and at an inclination thereto, a spring connected to the said blade for holding the same normally in a raised position, and pressing it against the teeth of the rake, the said spring being extended above the cleaning blade to a point above the rake head sufficient to permit of the blade being depressed to clear the points of the rake teeth, the said spring being coiled upon itself and united at its inner end portion to the handle of the rake, and stops for limiting the upward movement of the cleaning blade.

In testimony whereof I have signed my name to this specification in the presence of two subscribing witnesses.

WALTER BULLARD.

Witnesses:
W. K. HAYS,
JOHN W. CAVITT.